US012760896B2

(12) United States Patent
Kim et al.

(10) Patent No.: US 12,760,896 B2
(45) Date of Patent: Oct. 13, 2026

(54) INJECTOR, COMBUSTOR COMPRISING SAME, AND GAS TURBINE COMPRISING SAME

(71) Applicant: KOREA ADVANCED INSTITUTE OF SCIENCE AND TECHNOLOGY, Yuseong-gu (KR)

(72) Inventors: Kyu Tae Kim, Yuseong-gu (KR); Taesong Lee, Yuseong-gu (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/255,861

(22) PCT Filed: Aug. 30, 2022

(86) PCT No.: PCT/KR2022/012987
§ 371 (c)(1),
(2) Date: Jun. 2, 2023

(87) PCT Pub. No.: WO2023/058907
PCT Pub. Date: Apr. 13, 2023

(65) Prior Publication Data

US 2024/0027068 A1 Jan. 25, 2024

(30) Foreign Application Priority Data

Oct. 7, 2021 (KR) ........................ 10-2021-0133512
Dec. 27, 2021 (KR) ........................ 10-2021-0188701
Jul. 20, 2022 (KR) ........................ 10-2022-0089863

(51) Int. Cl.
*F23R 3/28* (2006.01)
*B05B 1/04* (2006.01)
(Continued)

(52) U.S. Cl.
CPC .............. *F23R 3/286* (2013.01); *B05B 1/044* (2013.01); *B05B 1/18* (2013.01); *B05B 1/1823* (2025.08);
(Continued)

(58) Field of Classification Search
CPC .... F23R 3/16; F23R 3/20; F23R 3/283; F23R 3/286; F23R 2900/00002;
(Continued)

(56) References Cited

U.S. PATENT DOCUMENTS 2,982,097 A * 5/1961 Hull .......................... F02K 9/52
60/39.461
3,408,998 A * 11/1968 Brancato .................. F24C 5/20
D23/317
(Continued)

FOREIGN PATENT DOCUMENTS

CN 1763427 A 4/2006
CN 101294714 A 10/2008
(Continued)

OTHER PUBLICATIONS

Office Action issued for corresponding Korean National Stage Application No. 10-2022-0089863, mailed Jan. 22, 2024. (Year: 2024).*
(Continued)

*Primary Examiner* — Jason H Duger
(74) *Attorney, Agent, or Firm* — Renner, Otto, Boisselle & Sklar, LLP

(57) ABSTRACT

The present invention relates to an injector, a combustor comprising same, and a gas turbine comprising same. The injector comprises: an injector body; and a slit portion formed through the injector body in a reference direction, wherein the slit portion comprises: a first slit portion having a shape extending along the circumferential direction of a
(Continued)

virtual reference circle having a virtual reference axis extending in the reference direction as a center thereof; and a second slit portion having a shape extending in the radial direction of the reference circle.

15 Claims, 12 Drawing Sheets

(51) Int. Cl.

| | |
|---|---|
| ***B05B 1/18*** | (2006.01) |
| ***B05B 1/34*** | (2006.01) |
| ***F02K 9/52*** | (2006.01) |
| ***F23R 3/16*** | (2006.01) |
| ***F23R 3/20*** | (2006.01) |

(52) U.S. Cl.
CPC .............. *B05B 1/3489* (2013.01); *F02K 9/52* (2013.01); *F23R 3/16* (2013.01); *F23R 3/20* (2013.01); *F23R 3/283* (2013.01); *F23R 2900/00002* (2013.01); *F23R 2900/00014* (2013.01)

(58) Field of Classification Search
CPC . F23R 2900/00014; B05B 1/18; B05B 1/185; B05B 1/044; B05B 1/3489; B05B 1/1823; F02K 9/52
USPC .................................................. 239/248, 249
See application file for complete search history.

(56) References Cited

U.S. PATENT DOCUMENTS

| | | | | |
|---|---|---|---|---|
| 3,916,619 | A | 11/1975 | Masai | |
| 4,057,190 | A | 11/1977 | Kiwior | |
| 5,603,213 | A * | 2/1997 | Sion | F02K 9/52 60/258 |
| 6,786,040 | B2 | 9/2004 | Boehnlein | |
| 9,163,839 | B2 | 10/2015 | Westmoreland | |
| 9,303,873 | B2 | 4/2016 | Stewart | |
| 9,371,787 | B2 | 6/2016 | Mcalister | |
| 9,534,787 | B2 | 1/2017 | Westmoreland | |
| 9,759,425 | B2 | 9/2017 | Westmoreland | |
| 10,352,568 | B2 | 7/2019 | Eroglu | |
| 10,408,457 | B2 | 9/2019 | Akiyama | |
| 10,634,357 | B2 | 4/2020 | Freitag | |
| 11,054,140 | B2 | 7/2021 | Choi | |
| 11,060,729 | B2 | 7/2021 | Roh | |
| 11,221,142 | B2 | 1/2022 | Shim | |
| 2003/0154720 | A1 | 8/2003 | Boehnlein | |
| 2005/0115244 | A1 | 6/2005 | Griffin et al. | |
| 2010/0218501 | A1 | 9/2010 | York et al. | |
| 2010/0248171 | A1 | 9/2010 | Hayashi et al. | |
| 2014/0190169 | A1 | 7/2014 | Melton | |
| 2014/0338339 | A1 | 11/2014 | Westmoreland | |
| 2015/0107549 | A1 | 4/2015 | Mcalister | |
| 2016/0186671 | A1 | 6/2016 | Austin | |
| 2017/0074519 | A1 | 3/2017 | Abe | |
| 2017/0074521 | A1 | 3/2017 | Horikawa | |
| 2017/0138598 | A1 | 5/2017 | Akiyama | |
| 2018/0187891 | A1* | 7/2018 | Mitani | F23R 3/286 |
| 2018/0299128 | A1 | 10/2018 | Shim | |
| 2019/0277502 | A1 | 9/2019 | Shershnyov et al. | |
| 2019/0285278 | A1 | 9/2019 | Choi | |
| 2020/0072466 | A1 | 3/2020 | Akiyama | |
| 2020/0080480 | A1 | 3/2020 | Horikawa | |
| 2021/0080108 | A1 | 3/2021 | Roh | |
| 2021/0164661 | A1 | 6/2021 | Wadayama | |
| 2021/0180518 | A1 | 6/2021 | Koganezawa | |
| 2021/0278086 | A1 | 9/2021 | Roh | |

FOREIGN PATENT DOCUMENTS

| | | | | |
|---|---|---|---|---|
| CN | 101294715 A | 10/2008 | | |
| CN | 107735617 A | 2/2018 | | |
| CN | 109579052 B | 4/2019 | | |
| EP | 2757242 A1 | 7/2014 | | |
| JP | S49-065407 A | 6/1974 | | |
| JP | 2005517862 A | 6/2005 | | |
| JP | 2009-002535 A | 1/2009 | | |
| JP | 2015-230120 A | 12/2015 | | |
| KR | 20040008282 A * | 1/2004 | | D06F 58/04 |
| KR | 101364416 B1 | 8/2012 | | |
| KR | 101625865 B1 | 7/2015 | | |
| KR | 20160078284 A | 7/2016 | | |
| KR | 101867690 B1 | 3/2017 | | |
| KR | 101864501 B1 | 5/2017 | | |
| KR | 101872801 B1 | 6/2018 | | |
| KR | 20180070210 A | 6/2018 | | |
| KR | 20190054817 A | 5/2019 | | |
| KR | 20190108955 A | 9/2019 | | |
| KR | 102218321 B1 | 3/2020 | | |
| KR | 102126882 B1 | 4/2020 | | |
| KR | 102138016 B2 | 7/2020 | | |
| KR | 102245798 B1 | 3/2021 | | |

OTHER PUBLICATIONS

Database WPI, Week 200661, Thomson Scientific, London, GB; AN 2006-586992 XP002811251.
Extended European Search Report issued for corresponding European National Stage application No. 22878728.9, mailed Apr. 9, 2024.
D.W. Davis et al., Effects of hydrogen on the thermo-acoustics coupling mechanisms of low-swirl injector flames in a model gas turbine combustor, Proceedings of the Combustion Institute 34(2) (2013), pp. 3135-3143.
J. Goldmeer, Power to gas: Hydrogen for power generation, GE Power Technical Report, GEA33861, 2019.
K. Inoue et al., Development of hydrogen and natural gas co-firing gas turbine, Mitsubishi Heavy Industries Technical Review vol. 55, No. 2 (2018).
M. Nose et al., "Hydrogen-fired gas turbine targeting realization of CO2-free society," Mitsubishi Heavy Industries Technical Review vol. 55, No. 4 (2018).
M.D. Pinchak et al., "The effects of nozzle geometry and equivalence ratio on a premixed reacting jet in vitiated cross-flow," Combustion and Flame 191 (2018), pp. 353-367.
N. Tekin et al., "Enhancement of fuel flexibility of industrial gas turbines by development of innovative hydrogen combustion systems," Gas Energy Issue 2 (2018).
O. Lindman et al., "SGT-750 fuel flexibility: engine and rig tests," Proceedings of ASME Turbo Expo 2017: Turbomachinery Technical Conference and Exposition GT2017, Jun. 26-30, 2017, Charlotte, NC, USA.
P. Stuttaford et al., "FlameSheet combustor engine and rig validation for operational and fuel flexibility with low emissions," Proceedings of ASME Turbo Expo 2016: Turbomachinery Technical Conference and Exposition GT2016 Jun. 13-17, 2016, Seoul, South Korea.
T. Lee et al., "Combustion dynamics of lean fully-premixed hydrogen-air flames in a mesoscale multinozzle array," Combustion and Flame, vol. 218 (2020), pp. 234-246.
T. Lee et al., "High-frequency transverse combustion instabilities of lean-premixed multislit hydrogen-air flames," Combustion and Flame vol. 238:111899, Apr. 2022.
V.N. Kornilov et al., Experimental and numerical investigation of the acoustic response of multi-slit Bunsen burners, Combustion and Flame 156 (2009), pp. 1957-1970.
W. York et al., "Advanced IGCC/hydrogen gas turbine development," Final Technical Report, DE-FC26-05NT42643 (2015) submitted to US Department of Energy.
International Search Report and Written Opinion for priority International Application No. PCT /KR2022/012987, mailed Nov. 25, 2022.

(56) References Cited

OTHER PUBLICATIONS

First Office Action issued for corresponding Japanese Patent Application No. 2024-520716, mailed Mar. 5, 2025.
Office Action issued for corresponding Korean National Stage Application No. 10-2022-0089863, mailed Jan. 22, 2024.

* cited by examiner (a)

(b)

(c)

(d)

INJECTOR, COMBUSTOR COMPRISING SAME, AND GAS TURBINE COMPRISING SAME

This application is a national phase of International Application No. PCT/KR2022/012987 filed Aug. 30, 2022, which claims priority to Republic of Korea (KR) Application Nos. 10-2021-0133512, filed Oct. 7, 2021; 10-2021-0188701, filed Dec. 27, 2021; and 10-2022-0089863, filed Jul. 20, 2022, each of which is hereby incorporated herein by reference in its entirety.

TECHNICAL FIELD

The present disclosure relates to an injector, a burner including the same, and a gas turbine including the same.

BACKGROUND ART

In recent years, starting with a report of UNFCCC that is an international organism for preventing global warming and Paris Agreement, discussions on carbon-neutrality for reducing the amount of carbon dioxide ($CO_2$) have been made all over the world. In particular, because power sector occupies about 25% of a total amount of discharged carbon dioxide and the power generation systems are generally driven for a long time of unit of several months, a measure for carbon-neutrality is strongly required.

Accordingly, the gas turbine manufacturers have determined hydrogen ($H_2$) that does not include carbon and thus does not generate carbon dioxide during combustion as a new measure, and thus have developed technologies using hydrogen from the early 2000-th.

However, hydrogen shows a high reactive property, and shows a flame propagation speed of about 6 times as high as those of existing fuels, such as methane, propane ($C_3H_8$) and ethylene ($C_2H_4$). Accordingly, hydrogen may have a wide operation range without a swirl generator but may tend to cause flashbacks as well.

The flashback means that a propagation speed of flames becomes higher than the flow velocity of supplied reactant mixture due to a high reactive property or strong combustion oscillations of hydrogen flame and thus the flames flow back. Because the flames that flowed back to an upstream side are attached to a site, at which a design for cooling is vulnerable and fuse a system, it is impossible to stably drive a hydrogen gas turbine in an existing burner nozzle structure that has utilized natural gas as a main fuel.

The industrial fields have sought to solve instability of flames of hydrogen by completely changing the shape of the injector. Because hydrogen flames easily incur flashbacks due to a large diameter of nozzles in a multi-nozzle injector including a swirl generator, most gas turbine manufacturers have employed a multi-tube or micro-mixer type nozzle having a diameter of unit of several millimeters to optimize the shape of the injector. FIG. 1 is a view conceptually illustrating a cross-section of a conventional multi-tube injector.

However, in a fuel of a high hydrogen fraction, it is still difficult to control flashbacks of flames even though a multi-tube design is utilized. That is, a new shape of an injector that may alleviate flashbacks of hydrogen flames has been required.

DISCLOSURE

Technical Problem

An aspect of the present disclosure provides an injector that may alleviate flashbacks of hydrogen flames, a burner including the same, and a gas turbine including the same.

Another aspect of the present disclosure provides an injector that may alleviate combustion oscillations, a burner including the same, and a gas turbine including the same.

Technical Solution

An injector according to an aspect of the present disclosure may include an injector body, and a slit formed to pass the injector body along a reference direction, and the slit may include a first slit portion having a shape that extends along a circumferential direction of an imaginary reference circle, a center of which is an imaginary reference axis that extends along the reference direction, and a second slit portion having a shape that extends along a radial direction of the reference circle.

In another example, the first slit portion may include a (1-1)-th slit having a shape that extends along an imaginary first reference circle, a center of which is the reference axis, and a (1-2)-th slit having a shape that extends along a circumferential direction of an imaginary second reference circle, a center of which is the reference axis and a diameter of which is larger than that of the first reference circle.

In another example, when it is assumed that an area between the first reference circle and the second reference circle is a first area, the second slit portion may include a (2-1)-th slit disposed in the first area and extending in a radial direction of the first reference circle.

In another example, when viewed along the reference direction, the (1-1)-th slit and the (2-1)-th slit may be spaced apart from each other along the radial direction of the first reference circle.

In another example, a plurality of (1-1)-th slits may be formed, and wherein the plurality of (1-1)-th slits may be spaced apart from each other along a circumferential direction of the first reference circle, and a portion of the first reference circle may have a shape of a first reference arc.

In another example, a plurality of (1-2)-th slits may be formed, the plurality of (1-2)-th slits may be spaced apart from each other along a circumferential direction of the second reference circle, and a portion of the second reference circle may have a shape of a second reference arc, and a size of a central angle of a first fan shape that defines the first reference arc may be larger than a size of a second fan shape that defines the second reference arc.

In another example, a plurality of (2-1)-th slits may be formed, and the plurality of (2-1)-th slits may be spaced apart from each other along the circumferential direction of the first reference circle.

In another example, a plurality of (1-1)-th slits may be formed, the plurality of (1-1)-th slits may be spaced apart from each other along the circumferential direction of the first reference circle, and when it is assumed that a space between a pair of (1-1)-th slits that are adjacent to each other is a (1-1)-th spacing space, the (2-1)-th slit may include a spacing space overlapping slit that overlaps the (1-1)-th spacing space when viewed along the radial direction.

In another example, a plurality of (1-1)-th slits and a plurality of (1-2)-th slots may be formed, and the number of the (1-1)-th slits may be smaller than the number of the (1-2)-th slits.

In another example, the first slit portion may further include a (1-3)-th slit having a shape that extends along a circumferential direction of an imaginary third reference circle, a center of which is the reference axis and a diameter of which is larger than that of the second reference circle, and when it is assumed that an area between the second reference circle and the third reference circle is a second area, the second slit portion may further include a (2-2)-th slit disposed in the second area and extending in a radial direction of the second reference circle.

In another example, a plurality of (2-1)-th slits and a plurality of (2-2)-th slots may be formed, and the number of the (2-1)-th slits may be smaller than the number of the (2-2)-th slits.

In another example, a plurality of (2-1)-th slits and a plurality of (2-2)-th slots may be formed, and the (2-2)-th slit may include an overlapping slit that overlaps any one of the (2-1)-th slits when viewed along the radial direction.

In another example, a plurality of (2-1)-th slits and a plurality of (2-2)-th slots may be formed, and when it is assumed that one direction that is perpendicular to the reference direction is a first direction and one direction that is perpendicular to the reference direction and the first direction is a second direction, the number of the (2-1)-th slits located in a first reference area defined by a first line extending from the reference axis along the first direction and a second line extending from the reference axis along the second direction, when viewed along the reference direction, may be the same as the number of the (2-2)-th slits located in the first reference area and the number of the (2-1)-th slits located in a second reference area defined by the first line and a third line extending from the reference axis along an opposite direction to the second direction may be smaller than the number of the (2-2)-th slits located in the second reference area.

In another example, the numbers of the (2-1)-th slits and the (2-2)-th slits located in the first reference area may be the same as the numbers of the (2-1)-th slits and the (2-2)-th slits located in a third reference area defined by a fourth line extending from the reference axis along an opposite direction to the first direction and the third line, and the numbers of the (2-1)-th slits and the (2-2)-th slits located in the second reference area may be the same as the numbers of the (2-1)-th slits and the (2-2)-th slits located in a fourth reference area defined by the second line and the fourth line, respectively.

In another example, the plurality of second slit portions may be provided, and the numbers of the second slit portions disposed on opposite sides of a reference plane that is an imaginary plane including the reference axis when the injector body is divided by the reference plane may be different.

A burner according to an aspect of the present disclosure may include a supply pipe that supplies a fuel and air, an injector coupled to the supply pipe and that injects the fuel and the air, which are introduced thereinto, and a combustion chamber configured such that the fuel and the air injected by the injector are introduced thereinto, the injector may include a slit extending along a reference direction, and the slit may include a first slit portion having a shape that extends along a circumference direction of an imaginary reference circle, and a second slit portion having a shape that extends along a radial direction of the reference circle.

A gas turbine according to an aspect of the present disclosure may include a compressor that compresses and discharge air, a burner that mixes a fuel and the air compressed and discharged by the compressor, and then generate a combustion gas by burning a mixture of the fuel and the air, and turbine blades that is rotated by the combustion gas delivered from the burner, the burner may include an injector that injects the fuel and the air compressed and discharged by the compressor, which are mixed, and the injector may include a slit including a first slit portion having a shape that extends along a circumferential direction of the imaginary reference circle and a second slit portion having a shape that extends along a radial direction of the reference circle.

Advantageous Effects

According to the present disclosure, because slits having smaller widths than those of an existing multi-tube injector are included, a flashback phenomenon may be alleviated.

Furthermore, according to the present disclosure, because the slits having widths that are similar to the thicknesses of the flames are included as compared with the conventional multi-tube circular injector to restrain a change of the surfaces of the flames, the instability of combustion may be alleviated and combustion oscillations may be alleviated.

MODE FOR INVENTION

Figure 1:
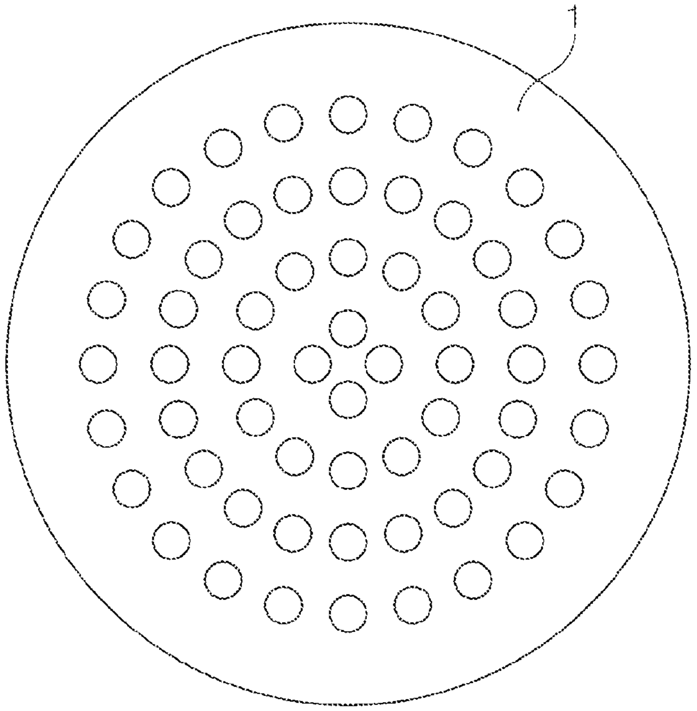
FIG. 1 is a view conceptually illustrating a conventional multi-tube injector.

This application claims the benefit of priority to Korean Patent Application No. 10-2021-0133512, filed in the Korean Intellectual Property Office on Oct. 7, 2021, Korean Patent Application No. 10-2021-0188701, filed in the Korean Intellectual Property Office on Dec. 27, 2021, and Korean Patent Application No. 10-2022-0089863, filed in the Korean Intellectual Property Office on Jul. 20, 2022, the entire contents of which are incorporated herein by reference.

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

Figure 2:
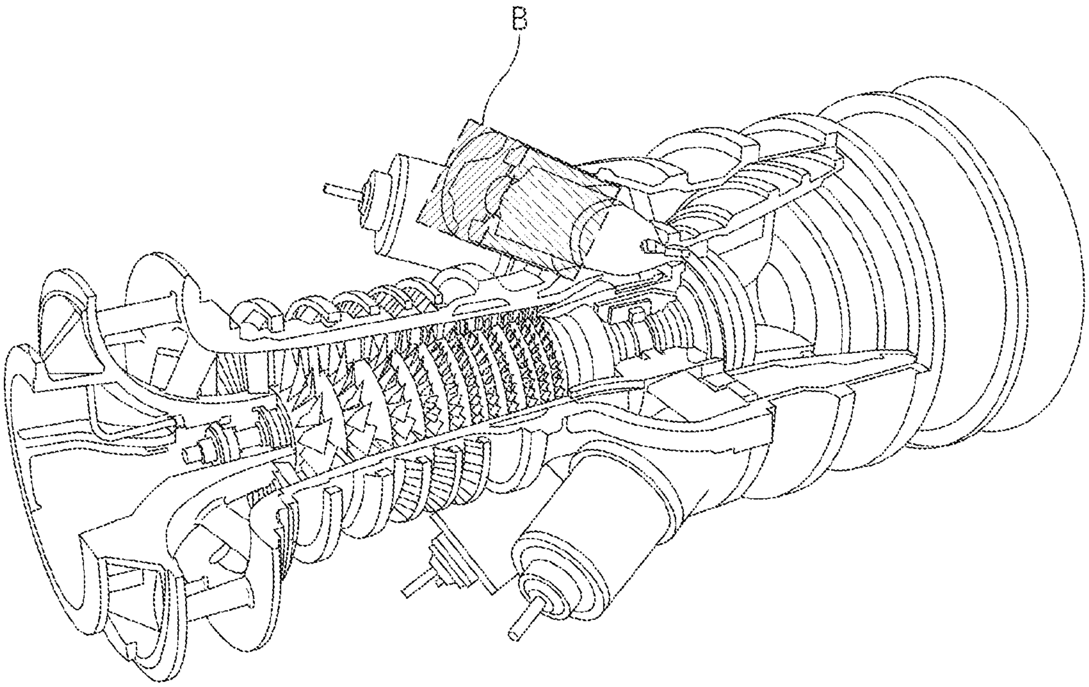
FIG. 2 is a cutaway perspective view conceptually illustrating a gas turbine, to which an injector according to the present disclosure may be applied.
Figure 3:
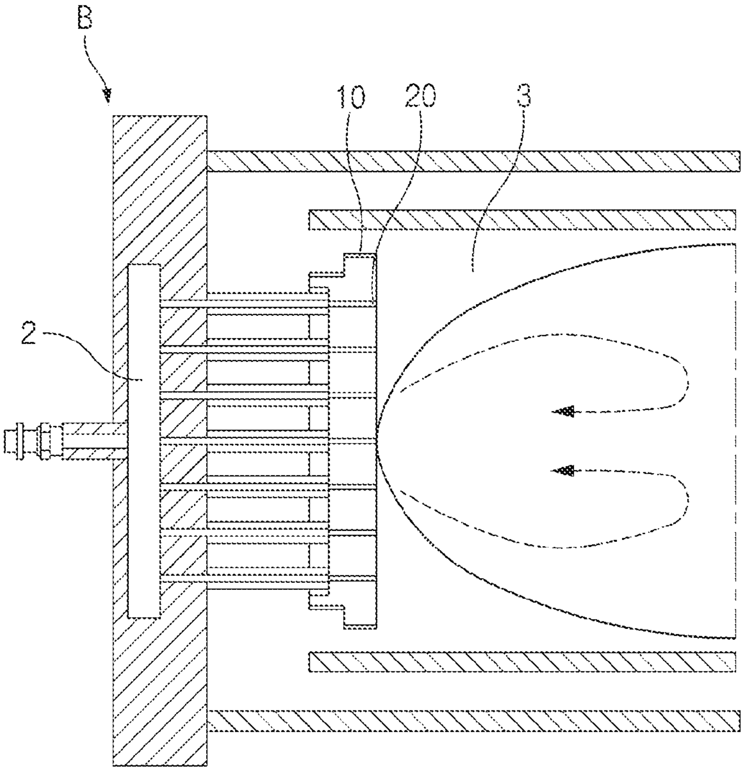
FIG. 3 is a view conceptually illustrating a cross-section of a burner, to which an injector according to the present disclosure may be applied.

An injector according to the present disclosure may be an injector that is applied to a burner of a gas turbine. FIG. 2 is a cutaway perspective view conceptually illustrating a gas turbine, to which an injector according to the present disclosure may be applied. FIG. 3 is a view conceptually illustrating a cross-section of a burner, to which an injector according to the present disclosure may be applied. FIG. 3 may be understood as a conceptual illustration of area "B" of FIG. 2.

Hereinafter, embodiments of injectors will be described in detail.

First Embodiment

Figure 4:
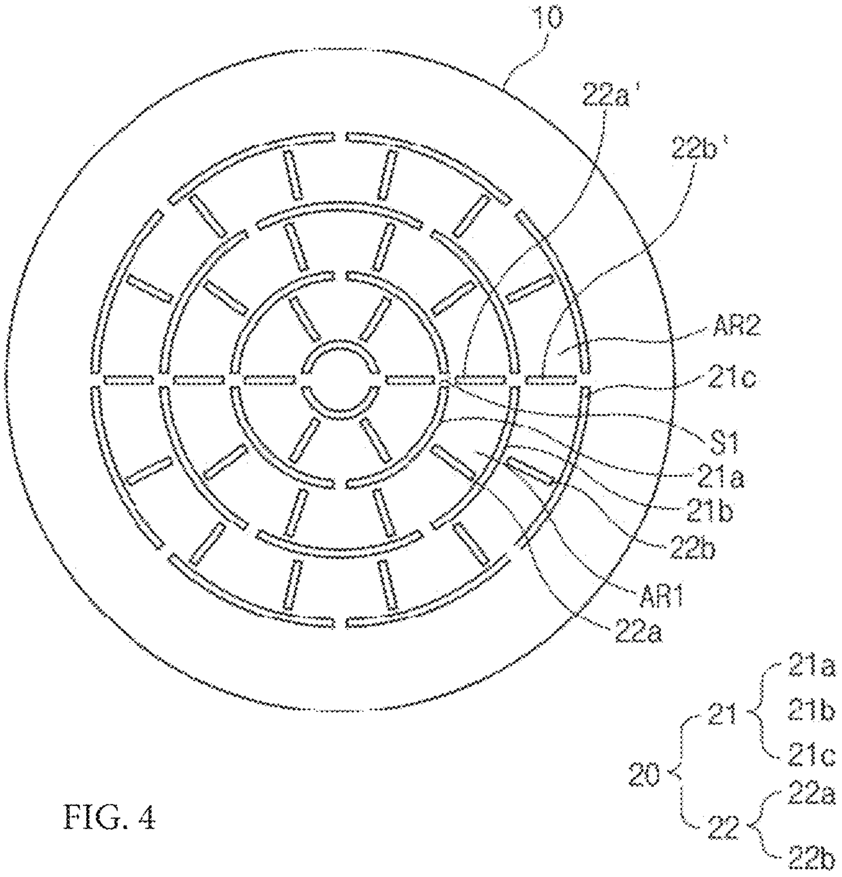
FIG. 4 is a view conceptually illustrating an appearance of an injector according to a first embodiment of the present disclosure, when viewed from a reference direction.
Figure 5:
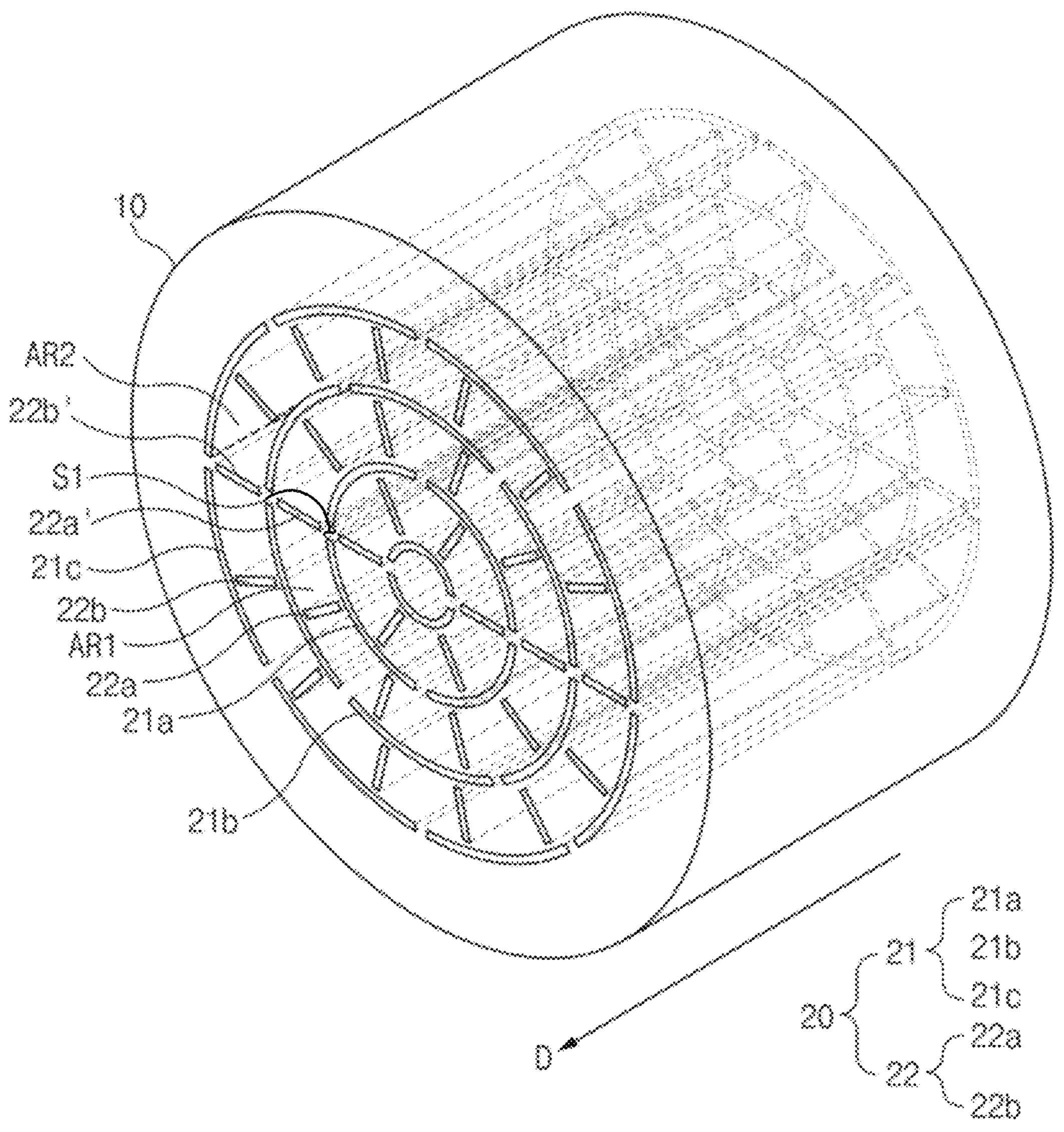
FIG. 5 is a view conceptually illustrating an injector according to a first embodiment of the present disclosure.
Figure 6:
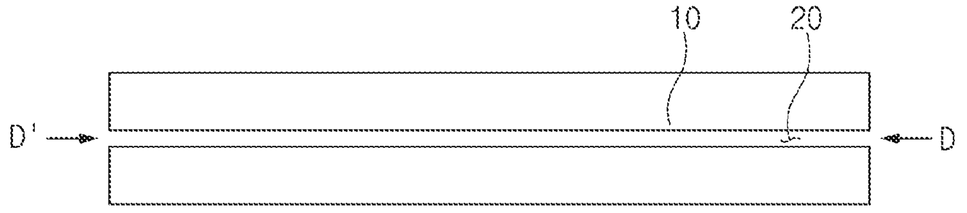
FIG. 6 is a view conceptually illustrating a cross-section of any one of slits of an injector according to a first embodiment of the present disclosure.

FIG. 4 is a view conceptually illustrating an appearance of an injector according to a first embodiment of the present disclosure, when viewed from a reference direction. FIG. 5 is a view conceptually illustrating the injector according to a first embodiment of the present disclosure. FIG. 6 is a view conceptually illustrating a cross-section of any one of slits of the injector according to a first embodiment of the present disclosure.

The injector may include an injector body 10 and slits 20. The slits 20 may be formed to pass through the injector body 10 along a reference direction "D". The injector body 10 may be formed of a metallic material. The injector body 10 may extend along the reference direction "D".

The slits 20 may include first slit portions 21 and second slit portions 22. The first slit portions 21 may have shapes that extend along a circumferential direction of an imaginary reference circle. The reference circle may be a circle, a center of which is an imaginary reference axis that extends along the reference direction "D".

A first width of the first slit portions 21 may be 0.37 mm to 2 mm. Preferably, the first width may be 1.5 mm. The first width may be a length of the first slit portions 21 along a direction that is perpendicular to an extension direction of the first slit portions 21. The first width may be similar to a thickness which hydrogen frames may theoretically have.

The second slit portions 22 may have shapes that extend along a radial direction of the reference circle. A second width of the second slit portions 22 may be 0.37 mm to 2 mm. Preferably, the second width may be 1.5 mm. The second width may be a length of the second slit portions 22 along a direction that is perpendicular to an extension direction of the second slit portions 22. The second width may be similar to a thickness which hydrogen frames may theoretically have.

The first slit portions 21 may include a (1-1)-th slit 21*a* and a (1-2)-th slit 21*b*. The (1-1)-th slit 21*a* may have a shape that extends along an imaginary first reference circle, a center of which is the reference axis. Furthermore, the (1-2)-th slit 21*b* may have a shape that extends along an imaginary second reference circle, a center of which is the reference axis. A diameter of the second reference circle may be larger than that of the first reference circle.

A plurality of slits 21*a* may be formed. The plurality of (1-1)-th slits 21*a* may be spaced apart from each other along a circumferential direction of the first reference circle, and may have shapes of a first reference arc RAC1 that is a portion of the first reference circle. A (1-1)-th spacing space S1 may be formed between a pair of (1-1)-th slits 21*a* that are adjacent to each other.

A plurality of slits 21*b* may be formed. The plurality of (1-2)-th slits 21*b* may be spaced apart from each other along a circumferential direction of the second reference circle, and may have shapes of a second reference arc RAC2 that is a portion of the second reference circle.

A size of a central angle of a first fan shape that defines the first reference arc RAC1 may be larger than a size of a central angle of a second fan shape that defines the second reference arc RAC2. This mean that the number of the (1-1)-th slits 21*a* is smaller than the number of the (1-2)-th slits 21*b*.

The slit portions 22 may include (2-1)-th slits 22*a*. The (2-1)-th slits 22*a* may be disposed in a first area AR1 and an overlap area OA, and may extend in a radial direction of the first reference circle. The first area AR1 may mean an area between the first reference circle and the second reference circle. The overlap area OA meaning the overlap of the central angle of the first fan shape that defines the first reference arc RAC1 and the central angle of the second fan shape that defines the second reference arc RAC2.

A plurality of slits 22*a* may be formed. The plurality of (2-1)-th slits 22*a* may be spaced apart from each other along a circumferential direction of the first reference circle.

The (2-1)-th slits 22*a* may include spacing space overlapping slits 22*a*'. The spacing space overlapping slits 22*a*' may mean the (2-1)-th slits that overlap the (1-1)-th spacing space S1 when viewed along radial directions of the plurality of (2-1)-th slits 22*a*. This may mean that the plurality of (2-1)-th slits 22*a* may include (2-1)-th slits that overlap the (1-1)-th spacing space S1 and (2-1)-th slits that do not overlap it, when viewed along the radial directions.

The first slit portions 21 may further include (1-3)-th slits 21*c*. The (1-3)-th slit 21*c* may have shapes that extend along a circumferential direction of a third reference circle. The third reference circle may be an imaginary circle, a center of which is the reference axis and a diameter of which is larger than that of the second reference circle.

A plurality of (1-3)-th slits 21*c* may be formed. The plurality of (1-3)-th slits 21*c* may be spaced apart from each other along the circumferential direction of the third reference circle, and may have shapes of a third reference arc that is a portion of the third reference circle.

The slit portions 22 may further include the (2-2)-th slits 22*b*. The (2-2)-th slits 22*b* may be disposed in a second area AR2, and may extend in a radial direction of the second reference circle. The second area AR2 may mean an area between the second reference circle and the third reference circle.

A plurality of (2-2)-th slits 22*b* may be formed. The plurality of (2-2)-th slits 22*b* may be spaced apart from each other along a circumferential direction of the second reference circle.

The (2-2)-th slits 22*b* may include overlapping slits 22*b*'. The overlapping slits 22*b*' may mean the (2-2)-th slits that overlap any one of the (2-1)-th slits 22*a*' when viewed along radial directions of the (2-2)-th slits 22*b*.

This may mean that the plurality of (2-2)-th slits 22*b* may include (2-2)-th slits that overlap any one of the (2-1)-th slits 22*a*, and (2-2)-th slits that do not overlap it.

The injector according to the first embodiment of the present disclosure may be an injector, in which a flashback phenomenon may be alleviated. FIG. 6 is a view conceptually illustrating a cross-section of any one of slits of the injector according to a first embodiment of the present disclosure. A premixed fuel/air mixture may be supplied to the slits 20 along the reference direction "D".

Figure 7:
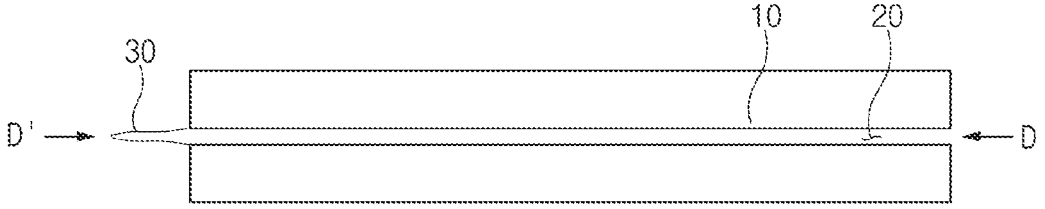
FIG. 7 is a view conceptually illustrating a flashback phenomenon.
Figure 7:
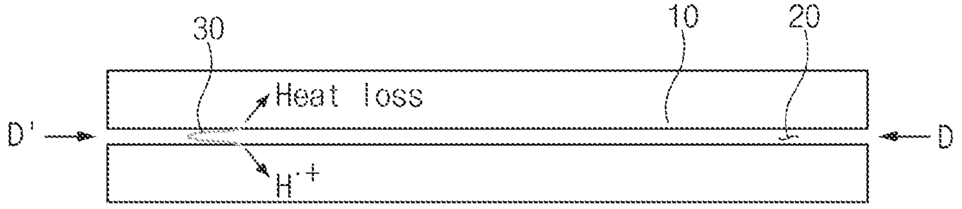
Figure 7:
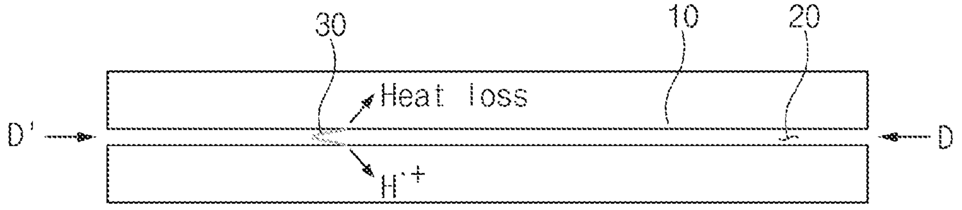
Figure 7:
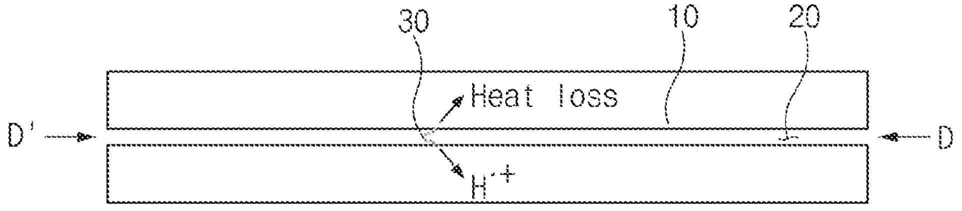

FIG. 7 is a view conceptually illustrating a flashback phenomenon. As illustrated in FIGS. 7A to 7D, flames 30 that undergo flashback may flow in an opposite direction D' to the reference direction "D". The injector according to the first embodiment of the present disclosure includes the slits 20, cross-sectional areas of which are larger than those of a conventional multi-tube nozzle with reference to volumes thereof. The slits 20 having the larger cross-sectional area with reference to volumes may decrease a flashback phenomenon as compared with the conventional multi-tube nozzle due to two following reasons.

First, the flames that undergo flashback may induce heat loss through the metallic injector body 10 while they pass through the slits 20. When the heat loss becomes higher than the heat generated by the combustion reaction, the combustion reaction may be suppressed. Because the present disclosure includes the slits 20 having the larger cross-sectional area than that of the multi-tube nozzle with reference to volumes, an area, in which the flames that flow back may contact an inner surface of the injector body 10, may be increased. Accordingly, heat loss may be increased as compared with the conventional multi-tube nozzle, which may decrease the flashback phenomenon.

Second, in the combustion process, radical ions are repeatedly generated and re-bonded. In the injector according to the first embodiment of the present disclosure, hydrogen radicals are diffused via a wall surface of the metallic injector body 10, and the diffusion of the hydrogen radicals on the wall surface may suppress the combustion reaction. The hydrogen radicals are intermediate products that are necessary for a combustion reaction mechanism, and the combustion reaction may be halted when the hydrogen radicals disappear due to the diffusion on the wall surface. Because the present disclosure includes the slits 20 having a larger cross-sectional area than that of the conventional multi-tube nozzle with reference to volumes, an area, in which the hydrogen radicals may disappear due to the diffusion on the wall surface, may be provided, and thus the flashback phenomenon may be alleviated.

Furthermore, the injector according to the first embodiment of the present disclosure may be an injector, in which combustion oscillations may be alleviated. The combustion oscillations are related to combustion instability. Because the combustion instability is dominantly influenced by a change in the shape of the flames, the change in the shape of the flames has to be minimized for the control. To minimize the change in the shape of the flames, the shape of the flames has to have a shape having a relatively large surface area.

In the conventional multi-tube nozzle, because the shape of the flames may be viewed conically due to the tubular shape, the conical flames may be contracted and expanded due to external perturbations. Accordingly, a possibility of, the shapes of the flames, being changed may be high.

The injector according to the first embodiment of the present disclosure includes the slits having a larger cross-sectional area with reference to volumes, a possibility of the change in the thin flame surface is relatively low, and thus, a heat release rate of the flames may become lower and an instability of combustion may be decreased, whereby combustion vibrations may be restrained.

Figure 8:
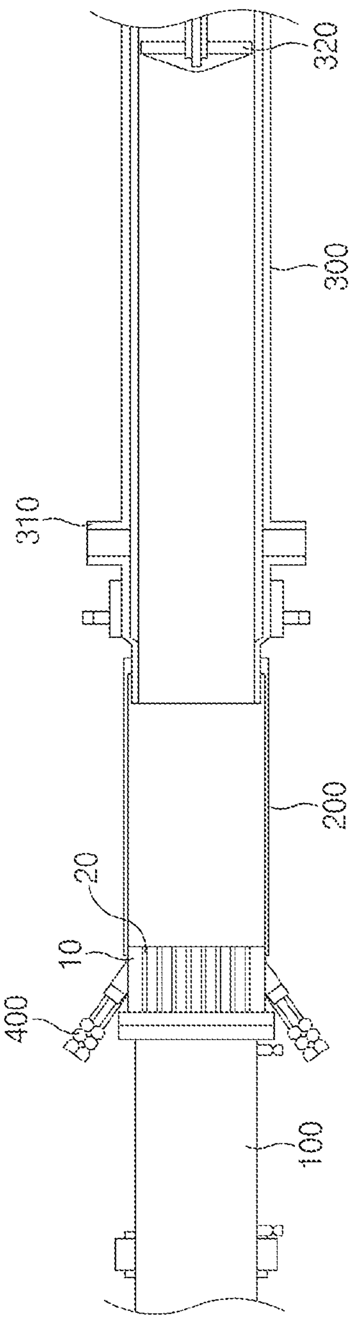
FIG. 8 is a view conceptually illustrating equipment for a hydrogen combustion test.
Figure 9:
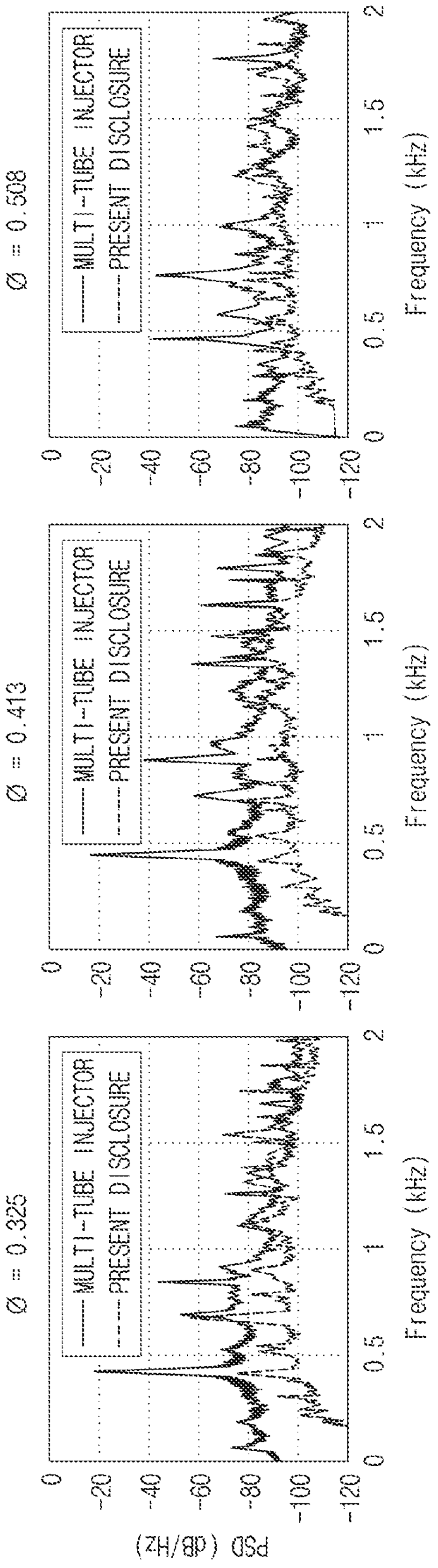
FIG. 9 is a view illustrating a comparison result of hydrogen combustion tests of the multi-tube injector of FIG. 1 and the injector of FIG. 4.

FIG. 8 is a view conceptually illustrating equipment for a hydrogen combustion test. FIG. 9 is a view illustrating a comparison result of hydrogen combustion tests of the multi-tube injector of FIG. 1 and the injector of FIG. 4.

The equipment for a hydrogen combustion test may include a fuel/air mixing part 100, a quartz tube 200, a metal tube 300, and a dynamic pressure sensor 400. The metal tube 300 may include a cooling air introducing pipe 310 and a piston 320. The injector body 10 may be disposed between the fuel/air mixing part 100 and the quartz tube 200. The dynamic pressure sensor 400 may be configured to measure a magnitude of acoustic vibrations due to the combustion vibrations.

For the hydrogen combustion test, the hydrogen/air mixture that passed through the fuel/air mixing part 100 was ignited in the injector body 10, and the magnitude of the acoustic vibrations due to the combustion vibrations was measured by the dynamic pressure sensor 400 after the planned flow velocity and equivalence ratio condition is reached.

In FIG. 9, results of hydrogen combustion tests of the multi-tube injector and the injector according to the first embodiment of the present disclosure in a condition, in which the flow velocity of the fuel/air mixture that passed through the slits 20 was 25 m/s and equivalence ratios (φ) were 0.325, and 0.508, respectively, are compared. Then, the equivalence ratio condition of the experiment corresponds to a level that is similar to or higher than a temperature utilized in management of an actual turbine in a condition, in which adiabatic flame temperatures were 1400 K, 1600 K, and 1800 K.

Figure 11:
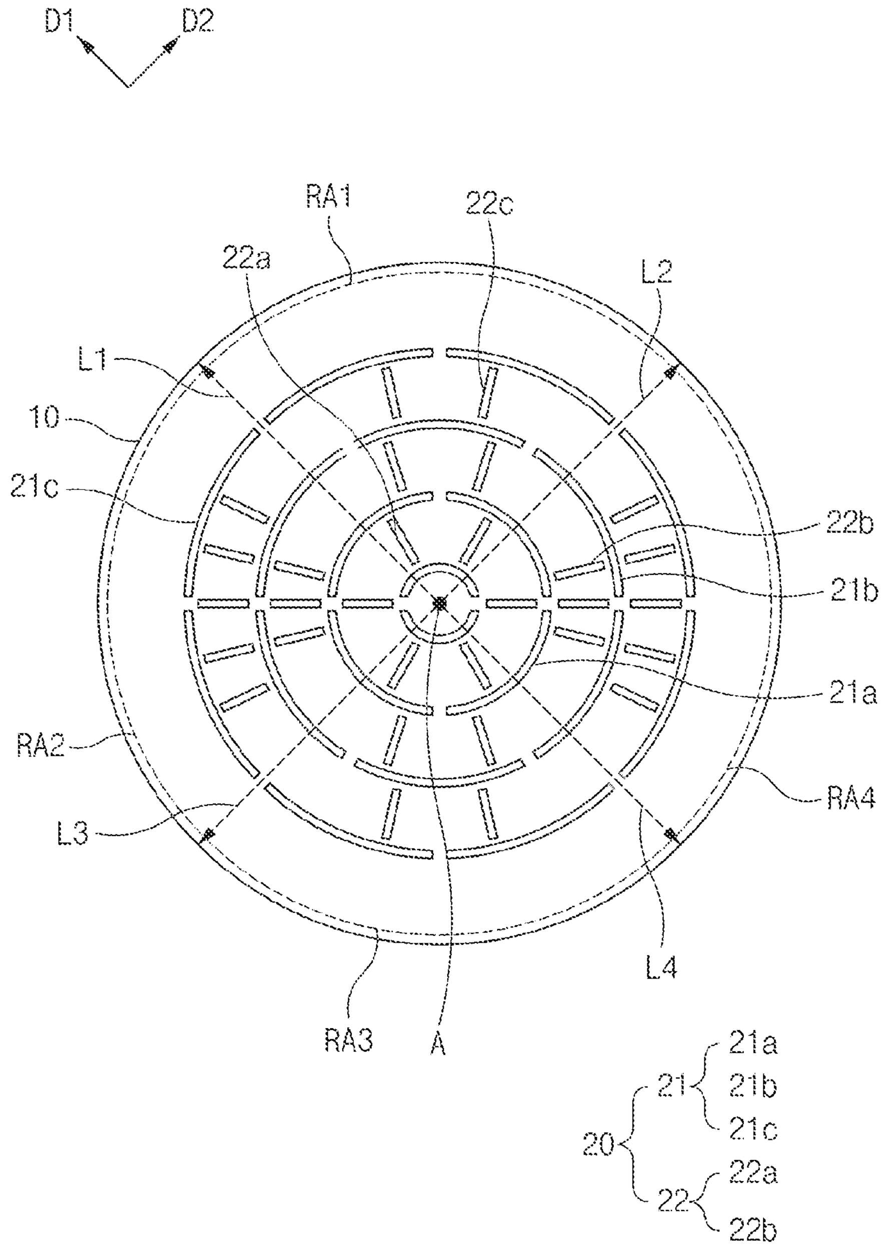
FIG. 11 is a view conceptually illustrating an appearance of an injector according to a second embodiment of the present disclosure, when viewed from a reference direction.

The X axis may mean frequencies. The PSD of the Y axis is a power spectral density, and is a value that shows the magnitude of acoustic vibrations due to the combustion vibrations. As illustrated in FIG. 11, it may be identified that the acoustic vibrations of the injector (a dotted line) according to the embodiment of the present disclosure were alleviated as compared with the conventional multi-tube injector (a solid line) in all equivalence ratio conditions.

Figure 10:
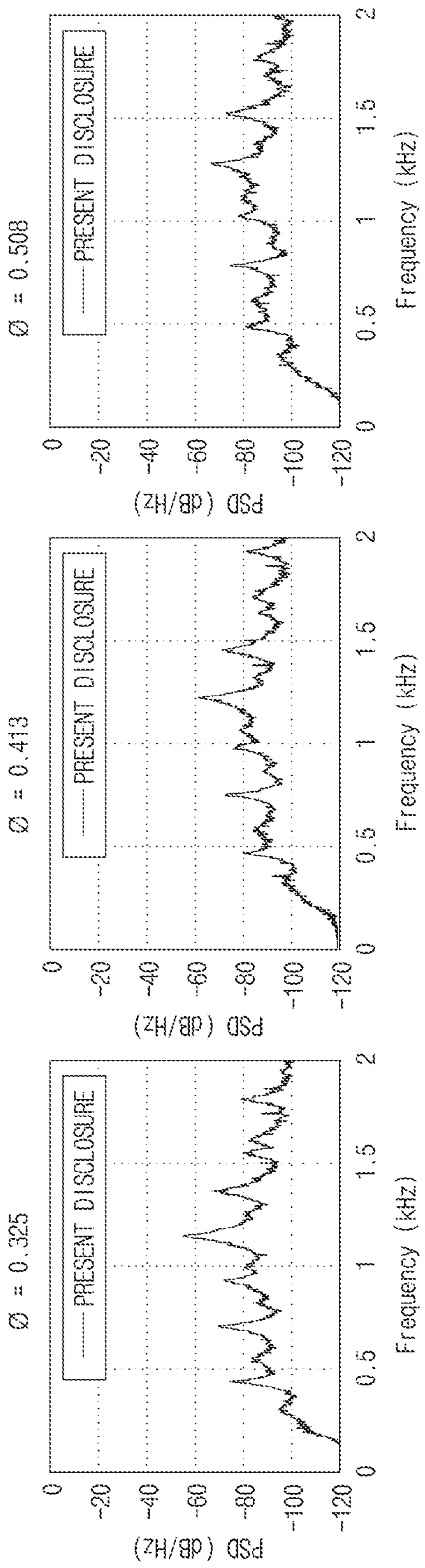
FIG. 10 is a view illustrating a result of a hydrogen combustion test when a flow velocity of a mixture of a fuel and air, which passes through a slit, is 50 m/s.

FIG. 10 is a view illustrating a result of a hydrogen combustion test when a flow velocity of a mixture of a fuel and air, which passes through a slit, is 50 m/s. In more detail, in FIG. 10, a result of a hydrogen combustion test of the injector according to the first embodiment of the present disclosure in a condition, in which the flow velocity of the fuel/air mixture that passed through the slits 20 was 50 m/s and equivalence ratios (φ) were 0.325, 0.413, and 0.508, respectively, was measured. It may be seen in FIG. 10 that an experimental result was secured in a situation that is similar to a management condition of an actual gas turbine. Referring to FIG. 10, it may be identified that the acoustic vibrations show an aspect that is stabilized as a whole similarly to the experimental result of FIG. 9.

Burner

Hereinafter, a burner including the injector according to the first embodiment of the present disclosure will be described in detail with reference to the above-described contents. The contents on the injector have been described above, and a detailed description thereof will be omitted. FIG. 3 may be referenced for understanding.

As illustrated in FIG. 3, a burner "B" may include a supply pipe 2, the injector, and a combustion chamber 3. The supply pipe 2 may be configured to supply a fuel and air. The injector may be coupled to the supply pipe 2 and may be configured to inject the fuel and the air, which are introduced. The combustion chamber 3 may be configured such that the fuel and the air, which are injected, may be introduced thereinto. Furthermore, in the combustion chamber 3, the fuel and the air, which are injected, may be mixed. A combustion reaction may occur in the combustion chamber 3.

Gas Turbine

Hereinafter, a gas turbine including the injector according to the first embodiment of the present disclosure will be described in detail with reference to the above-described contents. The contents on the injector have been described above, and a detailed description thereof will be omitted.

The gas turbine may include the burner "B" and turbine blades. The compressor may be configured to compress and discharge the air. The burner "B" may be configured to mix the fuel and the air compressed and discharged by the compressor, and then to generate a combustion gas by burning a mixture of the fuel and the air. The turbine blades may be configured to be rotated by the combustion gas delivered from the burner "B".

The burner "B" may include the injector that injects the fuel and the air compressed and discharged by the compressor, which are mixed.

Second Embodiment

FIG. 11 is a view conceptually illustrating an appearance of an injector according to a second embodiment of the present disclosure, when viewed from a reference direction. Hereinafter, referring to FIG. 11, the injector according to the second embodiment of the present disclosure will be described. The injector according to the second embodiment is different from the injector according to the first embodiment in disposition of the second slit portions. The same or corresponding reference numerals are given to configurations that are the same as or correspond to those of the injector according to the first embodiment, and a detailed description thereof will be omitted.

Hereinafter, one direction that is perpendicular to the reference direction "D" will be referred to a first direction D1, and one direction that is perpendicular to the reference direction "D" and the first direction D1 will be referred to as a second direction D2.

Furthermore, first to fourth lines L1, L2, L3, and L4 and first to fourth reference areas RA1, RA2, RA3, and RA4 will be defined for convenience of description. The first line L1 may mean a line that extends from the reference axis "A" along the first direction D1. The second line L2 may mean a line that extends from the reference axis "A" along the second direction D2. The third line L3 may mean a line that extends from the reference axis "A" along an opposite direction to the second direction D2. The fourth line L4 may mean a line that extends from the reference axis "A" along an opposite direction to the first direction D1.

The first reference area RA1 may mean an area that is defined by the first line L1 and the second line L2 when viewed along the reference direction "D". The second reference area RA2 may mean an area that is defined by the first line L1 and the third line L3. The third reference area RA3 may mean an area that is defined by the third line L3 and the fourth line L4. The fourth reference area RA4 may mean an area that is defined by the second line L2 and the fourth line L4. The first to fourth reference areas RA1, RA2, RA3, and RA4 may be disposed in a sequence thereof along a counterclockwise direction.

The number of the (2-1)-th slits located in the first reference area RA1 may be the same as the number of the (2-2)-th slits located in the first reference area RA1. Similarly, the number of the (2-2)-th slits located in the first reference area RA1 may be the same as the number of the (2-3)-th slits located in the first reference area RA1. As an example, each of the numbers of the (2-1)-th slits, the (2-2)-th slits, and the (2-3)-th slits located in the first reference area RA1 may be two.

The number of the (2-1)-th slits located in the second reference area RA2 may be smaller than the number of the (2-2)-th slits located in the second reference area RA2. Similarly, the number of the (2-2)-th slits located in the second reference area RA2 may be smaller than the number of the (2-3)-th slits located in the second reference area RA2. As an example, the number of the (2-1)-th slits located in the second reference area RA2 may be one, the number of the (2-2)-th slits may be three, and the number of the (2-3)-th slits may be five.

Meanwhile, the numbers of the (2-1)-th slits and the (2-2)-th slits located in the first reference area RA1 and the numbers of the (2-1)-th slits and the (2-2)-th slits located in the third reference area RA3 may be the same, respectively. Similarly, the number of the (2-3)-th slits located in the first reference area RA1 may be the same as the number of the (2-3)-th slits located in the third reference area RA3. That is, the first reference area RA1 and the third reference area RA3 may be formed to be symmetrical to each other.

The numbers of the (2-1)-th slits and the (2-2)-th slits located in the second reference area RA2 and the numbers of the (2-1)-th slits and the (2-2)-th slits located in the fourth reference area RA4 may be the same, respectively. Similarly, the number of the (2-3)-th slits located in the second reference area RA2 may be the same as the number of the (2-3)-th slits located in the fourth reference area RA4. That is, the second reference area RA2 and the fourth reference area RA4 may be formed to be symmetrical to each other.

The first slit portions 21 may be a configuration for dispersing distribution of frames in the radial direction and expanding an area of a nozzle. The second slit portions 22 may be a configuration for collapsing symmetry of distribution of flames in the circumferential direction through disposition or arrangement thereof. In more detail, when the disposition of the second slit portions 22 is changed to asymmetric disposition, the symmetry of the distribution of the flames may be collapsed. Because the high symmetry of the distribution of the flames may mean that big constructive interferences may occur, it may be regarded as high combustion instability.

That is, as described above, because the combustion instability is dominantly influenced by the change in the shape of the flames, the instability of combustion may become higher as the disposition of the second slit portions 22 becomes more symmetrical. This may mean that the instability of combustion may be alleviated as the disposition of the second slit portions 22 becomes more asymmetrical.

Because the asymmetry of the second slit portions 22 is higher than that of the injector according to the first embodiment in the case of the injector according to the second embodiment, the instability of combustion may be alleviated as compared with the injector according to the first embodiment.

Third Embodiment

Figure 12:
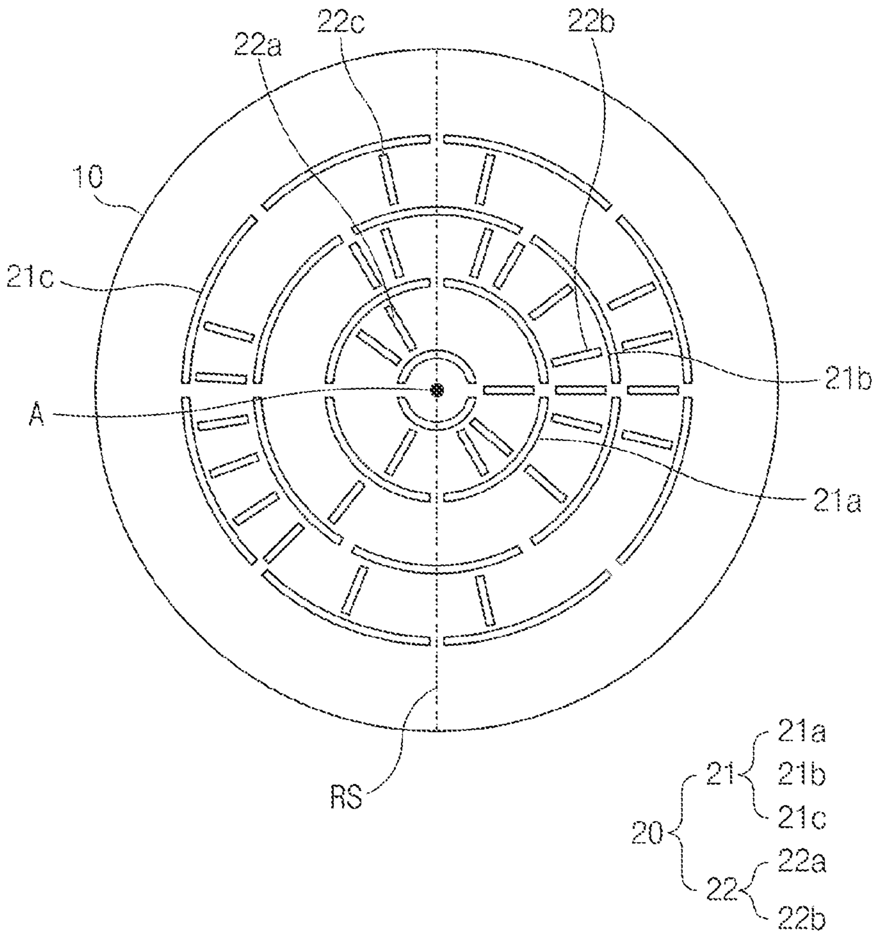
FIG. 12 is a view conceptually illustrating an appearance of an injector according to a third embodiment of the present disclosure, when viewed from a reference direction.

FIG. 12 is a view conceptually illustrating an appearance of an injector according to a third embodiment of the present disclosure, when viewed from a reference direction. Hereinafter, referring to FIG. 2, the injector according to the third embodiment of the present disclosure will be described. The injector according to the third embodiment is different from the injector according to the first embodiment in disposition of the second slit portions. The same or corresponding reference numerals are given to configurations that are the same as or correspond to those of the injector according to the first embodiment, and a detailed description thereof will be omitted.

In the injector according to the third embodiment, the numbers of the second slit portions 22 disposed on opposite sides of a reference plane RS that is an imaginary plane including the reference axis "A" when the injector body is divided by the reference plane RS. That is, the injector according to the third embodiment may be understood as being a form, in which the symmetry of the disposition of the second slit portions 22 is collapsed.

Because the asymmetry of the second slit portions 22 is higher than that of the injector according to the first and second embodiments in the case of the injector according to the third embodiment, the instability of combustion may be alleviated as compared with the injector according to the first and second embodiments.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

The invention claimed is:

1. An injector comprising:
an injector body; and
a slit formed to pass the injector body along a reference direction,
wherein the slit includes:
a first slit portion having a shape that extends along a circumferential direction of an imaginary reference circle, a center of which is an imaginary reference axis that extends along the reference direction; and
a second slit portion having a shape that extends along a radial direction of the reference circle,
wherein the first slit portion includes:
a (1-1)-th slit having a shape that extends along an imaginary first reference circle, a center of which is the reference axis; and
a (1-2)-th slit having a shape that extends along a circumferential direction of an imaginary second reference circle, a center of which is the reference axis and a diameter of which is larger than that of the first reference circle,
wherein when it is assumed that an area between the first reference circle and the second reference circle is a first area,
the second slit portion includes:
a (2-1)-th slit disposed in the first area and extending in a radial direction of the first reference circle, and
wherein the (2-1)-th slit includes a part disposed between the (1-1)-th slit and the (1-2)-th slit with respect to the radial direction of the first reference circle,
wherein the (1-1)-th slit defines a first reference arc which is a portion of the first reference circle,
wherein the (1-2)-th slit defines a second reference arc which is a portion of the second reference circle,
wherein the part of the (2-1)-th slit is formed on an area where a central angle of a first fan shape defining the first reference arc and a central angle of a second fan shape defining the second reference arc overlap each other, and
wherein the injector body includes a part surrounded by the (1-1)-th slit and positioned at the center of the reference circle so as to close the reference axis.

2. The injector of claim 1, wherein when viewed along the reference direction,
the (1-1)-th slit and the (2-1)-th slit are spaced apart from each other along the radial direction of the first reference circle.

3. The injector of claim 1, wherein a plurality of (1-1)-th slits are formed, and
wherein the plurality of (1-1)-th slits are spaced apart from each other along a circumferential direction of the first reference circle.

4. The injector of claim 3, wherein a plurality of (1-2)-th slits are formed,
wherein the plurality of (1-2)-th slits are spaced apart from each other along the circumferential direction of the second reference circle, and
wherein a size of the central angle of the first fan shape that defines the first reference arc is larger than a size of the second fan shape that defines the second reference arc.

5. The injector of claim 1, wherein a plurality of (2-1)-th slits are formed, and
wherein the plurality of (2-1)-th slits are spaced apart from each other along a circumferential direction of the first reference circle.

6. The injector of claim 5, wherein a plurality of (1-1)-th slits are formed, and
wherein the plurality of (1-1)-th slits are spaced apart from each other along the circumferential direction of the first reference circle, and
wherein when it is assumed that a space between a pair of (1-1)-th slits that are adjacent to each other is a (1-1)-th spacing space,
the (2-1)-th slit includes:
a spacing space overlapping slit that overlaps the (1-1)-th spacing space when viewed along the radial direction.

7. The injector of claim 1, wherein a plurality of (1-1)-th slits and a plurality of (1-2)-th slits are formed, and
wherein the number of the (1-1)-th slits is smaller than the number of the (1-2)-th slits.

8. The injector of claim 1, wherein the first slit portion further includes:
a (1-3)-th slit having a shape that extends along a circumferential direction of an imaginary third reference circle, a center of which is the reference axis and a diameter of which is larger than that of the second reference circle, and
wherein when it is assumed that an area between the second reference circle and the third reference circle is a second area,
the second slit portion further includes:
a (2-2)-th slit disposed in the second area and extending in a radial direction of the second reference circle.

9. The injector of claim 8, wherein a plurality of (2-1)-th slits and a plurality of (2-2)-th slits are formed, and
wherein the number of the (2-1)-th slits is smaller than the number of the (2-2)-th slits.

10. The injector of claim 8, wherein a plurality of (2-1)-th slits are formed, and
wherein the (2-2)-th slit includes:

an overlapping slit that overlaps any one of the (2-1)-th slits when viewed along the radial direction.

11. The injector of claim 8, wherein a plurality of (2-1)-th slits and a plurality of (2-2)-th slits are formed, and wherein when it is assumed that one direction that is perpendicular to the reference direction is a first direction and one direction that is perpendicular to the reference direction and the first direction is a second direction, the number of the (2-1)-th slits located in a first reference area defined by a first line extending from the reference axis along the first direction and a second line extending from the reference axis along the second direction, when viewed along the reference direction, is the same as the number of the (2-2)-th slits located in the first reference area and the number of the (2-1)-th slits located in a second reference area defined by the first line and a third line extending from the reference axis along an opposite direction to the second direction is smaller than the number of the (2-2)-th slits located in the second reference area.

12. The injector of claim 11, wherein the numbers of the (2-1)-th slits and the (2-2)-th slits located in the first reference area is the same as the numbers of the (2-1)-th slits and the (2-2)-th slits located in a third reference area defined by a fourth line extending from the reference axis along an opposite direction to the first direction and the third line, and wherein the numbers of the (2-1)-th slits and the (2-2)-th slits located in the second reference area is the same as the numbers of the (2-1)-th slits and the (2-2)-th slits located in a fourth reference area defined by the second line and the fourth line, respectively.

13. The injector of claim 1, wherein the second slit portion is one of a plurality of second slit portions that are provided, and wherein the plurality of the second slit portions are asymmetrically disposed on opposite sides of a reference plane that is an imaginary plane including the reference axis.

14. A burner comprising:

a supply pipe configured to supply a fuel and air;

an injector coupled to the supply pipe and configured to inject the fuel and the air, which are introduced thereinto; and a combustion chamber configured such that the fuel and the air injected by the injector are introduced thereinto, wherein the injector includes:

an injector body;

a slit formed to pass the injector body along a reference direction, and wherein the slit includes:

a first slit portion having a shape that extends along a circumferential direction of an imaginary reference circle, a center of which is an imaginary reference axis that extends along the reference direction; and a second slit portion having a shape that extends along a radial direction of the reference circle, wherein the first slit portion includes:

a (1-1)-th slit having a shape that extends along an imaginary first reference circle, a center of which is the reference axis; and a (1-2)-th slit having a shape that extends along a circumferential direction of an imaginary second reference circle, a center of which is the reference axis and a diameter of which is larger than that of the first reference circle, wherein when it is assumed that an area between the first reference circle and the second reference circle is a first area, the second slit portion includes:

a (2-1)-th slit disposed in the first area and extending in a radial direction of the first reference circle, and wherein the (2-1)-th slit includes a part disposed between the (1-1)-th slit and the (1-2)-th slit with respect to the radial direction of the first reference circle, wherein the (1-1)-th slit defines a first reference arc which is a portion of the first reference circle, wherein the (1-2)-th slit defines a second reference arc which is a portion of the second reference circle, wherein the part of the (2-1)-th slit is formed on an area where a central angle of a first fan shape defining the first reference arc and a central angle of a second fan shape defining the second reference arc overlap each other, and wherein the injector body includes a part surrounded by the (1-1)-th slit and positioned at the center of the reference circle so as to close the reference axis.

15. A gas turbine comprising:

a compressor configured to compress and discharge air;

a burner configured to mix a fuel and the air compressed and discharged by the compressor, and then generate a combustion gas by burning a mixture of the fuel and the air; and turbine blades configured to be rotated by the combustion gas delivered from the burner, wherein the burner includes:

an injector configured to inject the fuel and the air compressed and discharged by the compressor, which are mixed, and wherein the injector includes:

an injector body;

a slit formed to pass the injector body along a reference direction, and wherein the slit includes:

a first slit portion having a shape that extends along a circumferential direction of an imaginary reference circle, a center of which is an imaginary reference axis that extends along the reference direction; and a second slit portion having a shape that extends along a radial direction of the reference circle, wherein the first slit portion includes:

a (1-1)-th slit having a shape that extends along an imaginary first reference circle, a center of which is the reference axis; and a (1-2)-th slit having a shape that extends along a circumferential direction of an imaginary second reference circle, a center of which is the reference axis and a diameter of which is larger than that of the first reference circle, wherein when it is assumed that an area between the first reference circle and the second reference circle is a first area, the second slit portion includes:

a (2-1)-th slit disposed in the first area and extending in a radial direction of the first reference circle, and wherein the (2-1)-th slit includes a part disposed between the (1-1)-th slit and the (1-2)-th slit with respect to the radial direction of the first reference circle, wherein the (1-1)-th slit defines a first reference arc which is a portion of the first reference circle, wherein the (1-2)-th slit defines a second reference arc which is a portion of the second reference circle, wherein the part of the (2-1)-th slit is formed on an area where a central angle of a first fan shape defining the first reference arc and a central angle of a second fan shape defining the second reference arc overlap each other, and wherein the injector body includes a part surrounded by the (1-1)-th slit and positioned at the center of the reference circle so as to close the reference axis.

* * * * *